US009282168B2

(12) United States Patent
Prahlad

(10) Patent No.: US 9,282,168 B2
(45) Date of Patent: Mar. 8, 2016

(54) METHODS, DEVICES, AND SYSTEMS FOR ENABLING A PERSONAL CLOUD-COMPUTING ENVIRONMENT WITH UBIQUITOUS MOBILE ACCESS AND SOURCE-INDEPENDENT, AUTOMATED DATA AGGREGATION

(71) Applicant: Parablu Systems Pvt. Ltd., Bangalore (IN)

(72) Inventor: Veenatejaswini R. Prahlad, Bangalore (IN)

(73) Assignee: Parablu Systems Pvt. Ltd., Bangalore (IN)

( * ) Notice: Subject to any disclaimer, the term of this patent is extended or adjusted under 35 U.S.C. 154(b) by 493 days.

(21) Appl. No.: 13/706,385

(22) Filed: Dec. 6, 2012

(65) Prior Publication Data

US 2013/0144939 A1    Jun. 6, 2013

Related U.S. Application Data

(60) Provisional application No. 61/567,143, filed on Dec. 6, 2011.

(51) Int. Cl.
*H04L 29/06* (2006.01)
*H04L 29/08* (2006.01)
*G06F 17/30* (2006.01)

(52) U.S. Cl.
CPC .......... *H04L 67/42* (2013.01); *G06F 17/30067* (2013.01); *H04L 67/10* (2013.01)

(58) Field of Classification Search
CPC ......... H04L 63/20; H04L 63/10; H04L 63/08; H04L 63/123; H04L 67/303; G06F 9/45533; G06F 21/6218; G06F 17/30194; G06F 17/30115

See application file for complete search history.

(56) References Cited

U.S. PATENT DOCUMENTS

| | | | |
|---|---|---|---|
| 2010/0325199 A1 | 12/2010 | Park et al. | |
| 2011/0209064 A1* | 8/2011 | Jorgensen et al. | 715/733 |
| 2011/0216179 A1* | 9/2011 | Dialameh et al. | 348/62 |
| 2013/0283187 A1* | 10/2013 | Laird-McConnell et al. | 715/748 |
| 2015/0058399 A1* | 2/2015 | Simmons et al. | 709/202 |

* cited by examiner

*Primary Examiner* — Djenane Bayard
(74) *Attorney, Agent, or Firm* — Reuven K. Mouallem, Esq.; FlashPoint IP Ltd.

(57) ABSTRACT

The present invention discloses methods, devices, and systems for enabling a personal cloud-computing environment with ubiquitous mobile access and source-independent, automated data aggregation. Methods include the step of: upon receiving at least one file-selection notification from at least one computing device operationally connected to the personal cloud-computing environment, determining, based on at least one file-selection notification, whether to perform a local file-access operation on at least one computing device or to perform a remote file-access operation on a remote storage element in the personal cloud-computing environment. Other methods include the steps of: utilizing a phone-network infrastructure for maintaining operational connectivity of a personal cloud, wherein the personal cloud resides in a local network, and wherein the operational connectivity includes connectivity with at least one foreign network; and providing at least one data-management capability via the phone-network infrastructure to at least one computing device operationally connected to the personal cloud.

9 Claims, 2 Drawing Sheets

METHODS, DEVICES, AND SYSTEMS FOR ENABLING A PERSONAL CLOUD-COMPUTING ENVIRONMENT WITH UBIQUITOUS MOBILE ACCESS AND SOURCE-INDEPENDENT, AUTOMATED DATA AGGREGATION

CROSS REFERENCE TO RELATED APPLICATIONS

This patent application claims priority under 35 U.S.C. §119(e) to U.S. Provisional Patent Application No. 61/567,143 filed Dec. 6, 2011, which is hereby incorporated by reference in its entirety.

FIELD AND BACKGROUND OF THE INVENTION

The present invention relates to methods, devices, and systems for enabling a personal cloud-computing environment with ubiquitous mobile access and source-independent, automated data aggregation.

Computing tablets and smartphones are increasingly taking over the role of personal-computing devices. There are many times more mobile phones than Personal Computers (PCs) in use today, and that gap is widening. Households increasingly own more than one computing device; it is not uncommon to see an average household boasting 2 PCs/laptops, 3 or more smartphones, and a tablet (e.g., iPad®).

Mobile devices in recent years have become more advanced computationally, and are becoming a natural repository for personal data such as short movies and Office/PDF documents in addition to the standard content like contacts, calendar, pictures, and music. Continuing with this functional evolution, mobile devices can rapidly become the consumer's comprehensive photo-album, as well as the viewing mechanism for books, television, and even full-fledged feature films.

While technology in mobile devices is quite advanced today, as a technology solution, they still face a number of the same problems that PCs of yesteryear did. As an example, managing personal data and storage capacity effectively on multiple devices, and the ability to find data quickly amongst a plurality of devices when it is necessary, are both problems for which effective solutions don't exist using current technology. It is usually hard to remember which device contains the latest version of a document, or where the picture of a special family occasion from five years ago is actually stored at any given point in time. Also, smartphone and tablet data today is technologically off-limits for any kind of governance—either for business compliance or simply for parental control.

Cloud computing, in which resources are stored and accessed on a distributed network, is becoming a preferred information-technology (IT) solution for data storage. Beside storage, the cloud-computing environment provides expanded access for mobile users. The emergence of a personal cloud in which users can control access and maintain complete privacy is attracting more attention. This would enable a user to benefit greatly from ubiquitous access while ensuring that their data stays completely in their control, and not sent over the Internet to a cloud or storage provider. A personal cloud, which allows automatic aggregation of data from multiple devices, and provides a unified search, while preserving complete privacy and providing access from anywhere, is still not known in the prior art.

It would be desirable to have methods, devices, and systems for enabling a personal cloud-computing environment with ubiquitous mobile access and source-independent, automated data aggregation. Such methods, devices, and systems would, inter alia, overcome the limitations mentioned above.

SUMMARY OF THE INVENTION

It is the purpose of the present invention to provide methods, devices, and systems for enabling a personal cloud-computing environment with ubiquitous mobile access and source-independent, automated data aggregation.

In the interest of clarity, several terms which follow are specifically defined for use herein. The term "resource" is used herein to refer to any computing service which provides data storage, computing, networking capacity, algorithmic capabilities, software capabilities, and/or software-based objects using hardware or software provided by any service provider.

Furthermore, it is noted that the term "exemplary" is used herein to refer to examples of embodiments and/or implementations, and is not meant to necessarily convey a more-desirable use-case. Similarly, the terms "preferred" and "preferably" are used herein to refer to an example out of an assortment of contemplated embodiments and/or implementations, and is not meant to necessarily convey a more-desirable use-case. Therefore, it is understood from the above that "exemplary" and "preferred" may be applied herein to multiple embodiments and/or implementations.

It is noted that a non-transitory computer-readable medium includes a hard drive, a compact disc, flash memory, volatile memory, non-volatile memory, and similar device memory, but does not include a transitory signal per se.

Preferred embodiments of the present invention provide an easy-to-use mechanism to protect a device's valuable data by seamlessly creating a redundant copy of it in a cloud-computing environment. Such embodiments can extend the computing device's storage capability beyond the actual physical storage attached to it by using the cloud storage. The data transferred to the cloud lends itself for operations like analytics, governance, and search which individual users, parents, or corporations can employ as the need dictates.

Preferred embodiments of the present invention enable data to be moved from the computing device into a (public or private) cloud with as little disruption to the user as possible, maintaining the data to be easily searched, located, and recovered when needed. All data transfers from the device to the web storage are compressed to save bandwidth and encrypted for security.

Preferred embodiments of the present invention include a web-based storage service and a device-specific client application. The web-based storage can allow the data to be sent to: (1) a public cloud over the Internet with commercially-available cloud-storage vendors (e.g., Amazon S3 or Microsoft Azure) to handle backend storage needs, (2) an on-premise server or cloud of servers maintained within a corporate data center (i.e., a private cloud) with a interface module for deploying on conventional servers (e.g., Linux), or (3) a home storage device (hereinafter referred to as a "personal cloud") which can be especially useful if there is concern about sending and storing private data on the public Internet.

An example of a personal-cloud implementation can include a wireless, 3G-enabled storage device, serving as a central storage repository for a household or a small community, optionally combined with the capabilities of a wireless router or even a TV set-top box.

Other embodiments of the present invention enable existing phone-network infrastructure, which most countries already have, to be leveraged by users to retain full control and privacy of data. Such embodiments can be implemented using 3G/4G or similar high-speed access utilizing the phone network as a gateway to a user's personal cloud. Using a simple user interface (UI) (e.g., a voice-navigation menu and/or a user's phone keypad), user credentials can be provided, and data management performed (e.g., file transfer, backup, update, and organization). Furthermore, such an approach provides users with a single-search interface for data originating from multiple devices.

As an additional feature, underdeveloped and developing countries could greatly benefit from a solution which provides true ubiquitous connectivity, as well as developed countries which could benefit from circumventing spotty connections, signal outages, and load-balancing problems, for example. The cell-phone network solution described above also addresses situations in which the user is outside the periphery of a broadband network, usually provided by a DSL or cable provider, and still has a need to access their personal data in the cloud.

Embodiments of the present invention allow end users of mobile devices to access "cloud data" with a completely seamless user experience for data transfer and state awareness/signaling. An end user simply accesses data on the file system of his/her mobile device with no prior knowledge of where the data source is. The system figures out the most current location of the data, automatically downloads the requested data (hereinafter such a process is referred to as "Download on Demand" or "DoD"), and provides the data to the user.

Such implementations can be used to effectively manage space on the device's local memory, and shift seldom-used data to the cloud. Such embodiments also allow the end user to have immediate access to all his/her data, even if the content was generated on devices other than the one the user is currently using, without necessarily taking up room on their local device memory. Such implementations employ the ability of the file system itself to keep a catalogue of its contents, without creating a new catalogue of files coming from cloud sources.

Embodiments of the present invention allow end users to use a phone network (e.g., EDGE, 3G, EVDO, HSPA, LTE, 4G) to ensure that a personal cloud is always connected and reachable; not so much for the user to reach the cloud, but for the cloud to use the phone network to keep itself online Personal clouds typically located inside a home can provide connectivity to all connected devices on the Wi-Fi network operated in the home. However, for the personal cloud to be truly effective, the personal cloud needs to be available at anytime and from anywhere, even if the end user and his/her device are outside the range of the Wi-Fi network. Such personal-cloud implementations as outlined above can utilize a phone network to enable the personal cloud to be online all the time.

Therefore, according to the present invention, there is provided for the first time a method for enabling a personal cloud-computing environment with source-independent, automated data aggregation, the method including the step of: (a) upon receiving at least one file-selection notification from at least one computing device operationally connected to the personal cloud-computing environment, determining, based on at least one file-selection notification, whether to perform a local file-access operation on at least one computing device or to perform a remote file-access operation on a remote storage element in the personal cloud-computing environment, wherein the remote storage element includes any storage element on any other at least one computing device operationally connected to the personal cloud-computing environment.

Preferably, the step of determining is further based on at least one file-access notification, and wherein at least one file-access notification is related to at least one file-selection notification.

Preferably, the method further includes the step of: (b) upon performing one of the file-access operations, performing a metadata operation on at least one remotely-stored metadata file.

According to the present invention, there is provided for the first time a method for enabling a personal cloud-computing environment with ubiquitous mobile access, the method including the steps of: (a) utilizing a phone-network infrastructure for maintaining operational connectivity of a personal cloud network, wherein the personal cloud network resides in a local network, and wherein the operational connectivity includes connectivity with at least one foreign network other than the local network; and (b) providing at least one data-management capability via the phone-network infrastructure to at least one computing device operationally connected to the personal cloud network.

According to the present invention, there is provided for the first time a device for enabling a personal cloud-computing environment with source-independent, automated data aggregation, the device including: (a) a CPU for performing computational operations; (b) a memory module for storing data; (c) a network connection for communicating across a network; and (d) a determination module configured for: (i) upon receiving at least one file-selection notification from at least one computing device operationally connected to the personal cloud-computing environment, determining, based on at least one file-selection notification, whether to perform a local file-access operation on at least one computing device or to perform a remote file-access operation on a remote storage element in the personal cloud-computing environment, wherein the remote storage element includes any storage element on any other at least one computing device operationally connected to the personal cloud-computing environment.

Preferably, the determining is further based on at least one file-access notification, and wherein at least one file-access notification is related to at least one file-selection notification.

Preferably, the determination module is further configured for: (ii) upon performing one of the file-access operations, performing a metadata operation on at least one remotely-stored metadata file.

According to the present invention, there is provided for the first time a system for enabling a personal cloud-computing environment with ubiquitous mobile access, the system including: (a) a server including: (i) a CPU for performing computational operations; (ii) a memory module for storing data; and (iii) a network connection for communicating across a network; and (b) a data-management module, residing on the server, configured for: (i) utilizing a phone-network infrastructure for maintaining operational connectivity of a personal cloud network, wherein the personal cloud network resides in a local network, and wherein the operational connectivity includes connectivity with at least one foreign network other than the local network; and (ii) providing at least one data-management capability via the phone-network infrastructure to at least one computing device operationally connected to the personal cloud network.

According to the present invention, there is provided for the first time a non-transitory computer-readable medium, having computer-readable code embodied on the non-transitory computer-readable medium, the computer-readable code including: (a) program code for, upon receiving at least one file-selection notification from at least one computing device operationally connected to a personal cloud-computing environment, determining, based on at least one file-selection notification, whether to perform a local file-access operation on at least one computing device or to perform a remote file-access operation on a remote storage element in the personal cloud-computing environment, wherein the remote storage element includes any storage element on any other the at least one computing device operationally connected to the personal cloud-computing environment.

Preferably, the determining is further based on at least one file-access notification, and wherein at least one file-access notification is related to at least one file-selection notification.

Preferably, the computer-readable code further includes: (b) program code for, upon performing one of the file-access operations, performing a metadata operation on at least one remotely-stored metadata file.

According to the present invention, there is provided for the first time a non-transitory computer-readable medium, having computer-readable code embodied on the non-transitory computer-readable medium, the computer-readable code including: (a) program code for utilizing a phone-network infrastructure for maintaining operational connectivity of a personal cloud network, wherein the personal cloud network resides in a local network, and wherein the operational connectivity includes connectivity with at least one foreign network other than the local network; and (b) program code for providing at least one data-management capability via the phone-network infrastructure to at least one computing device operationally connected to the personal cloud network.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to methods, devices, and systems for enabling a personal cloud-computing environment with ubiquitous mobile access and source-independent, automated data aggregation. The principles and operation for such methods, devices, and systems according to the present invention, may be better understood with reference to the accompanying description and drawings.

Figure 1:
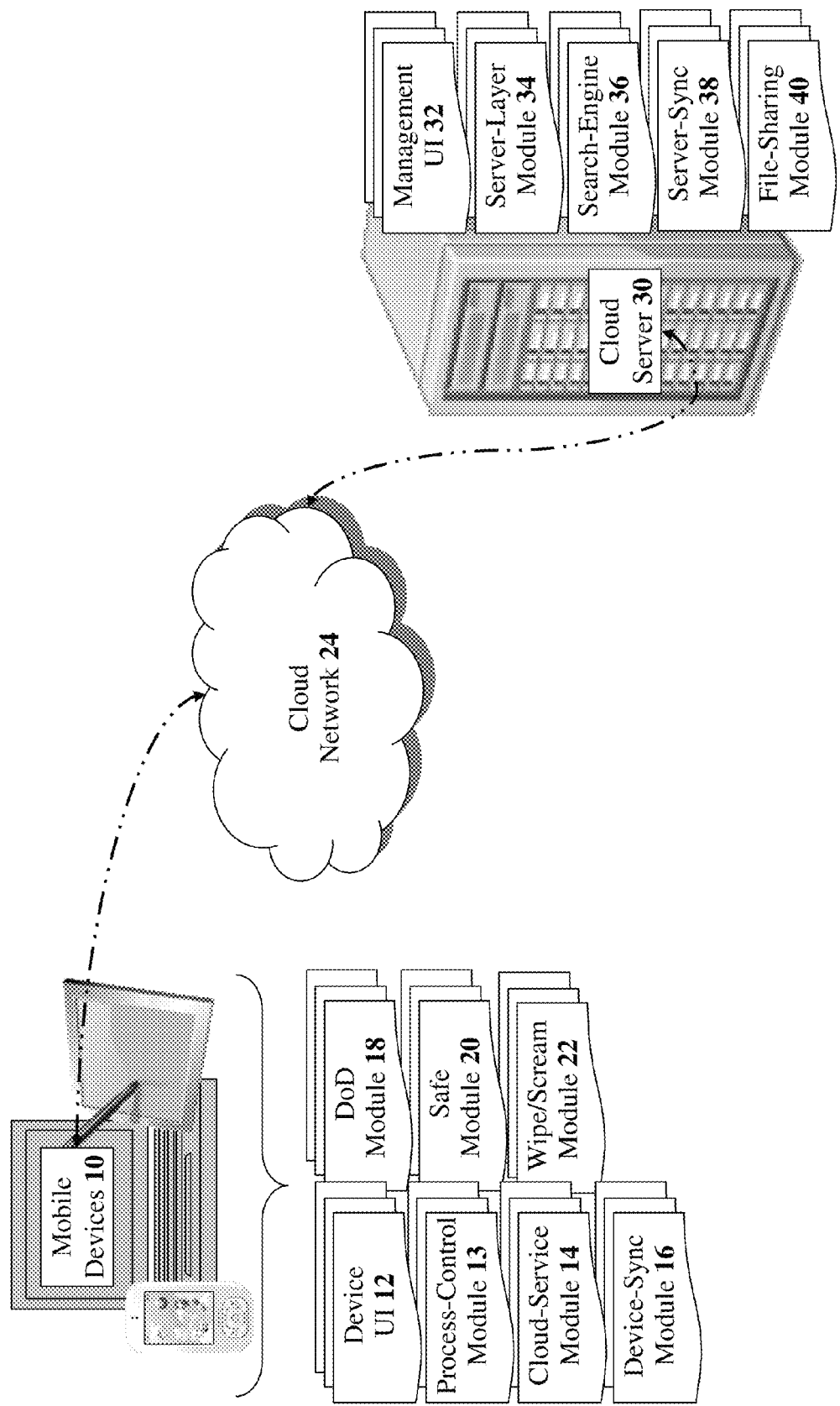
FIG. 1 is a high-level schematic block diagram of the components employed in enabling a personal cloud-computing environment with ubiquitous mobile access and source-independent, automated data aggregation, according to preferred embodiments of the present invention.

Referring now to the drawings, FIG. 1 is a high-level schematic block diagram of the components employed in enabling a personal cloud-computing environment with ubiquitous mobile access and source-independent, automated data aggregation, according to preferred embodiments of the present invention. Mobile devices 10 are shown in FIG. 1 having a device UI 12, a process-control module 13, a cloud-service module 14, a device-sync module 16 for immediate/real-time replication, a DoD module 18 for accessing offline/remotely-located files, a safe module 20 for backup and restore functions, and a wipe/scream module 22. Device UI 12 enables mobile devices 10 to access a personal cloud network 24 (e.g., for searching, retrieving, browsing, restoring, managing configuration management, and reporting). Cloud-service module 14 may run as a virtual (server) appliance on mobile devices 10.

A cloud server 30 is shown having a web-based management UI 32, a server-layer module 34, a search-engine module 36, a server-sync module 38, a file-sharing module 40 for sharing specific files with external collaborators, and integration modules for allowing search of external data sources (e.g., Facebook, LinkedIn, Google Docs, and MS SkyDrive) to provide pervasive search capabilities. Search-engine module 36 may be configured to provide exclusive private-cloud search capabilities (but including public user accounts) to prevent unauthorized individuals from viewing search criteria.

Server-layer module 34 provides REST (representational state transfer) services in which requests and responses are built around the transfer of representations of resources (i.e., essentially any coherent and meaningful concept that may be addressed). A representation of a resource is typically a document that captures the current or intended state of a resource. A client begins sending requests when it is ready to make a transition to a new state. While one or more requests are outstanding, the client is considered to be in transition. The representation of each application state contains links that may be used next time the client chooses to initiate a new state transition.

Mobile devices 10 are uniquely identified by device identifiers (e.g., serial number, IMEI number, or MAC address) and a password(s). When data is uploaded from mobile device 10 via cloud-service module 14 to cloud network 24, the upload process is authenticated with server-layer module 34 to obtain information before transferring the data.

Process-control module 13 monitors state changes, tests for network connectivity before launching backup operations, periodically tracks backup and restore operations as successful, in-progress, aborted, or failed (e.g., stored in an SQL Lite database) to ensure that interrupted operations are restarted, and queues data-transfer operations to occur sequentially.

Device-sync module 16 and server-sync module 38 enable newly-created data to be identified, and trigger as soon as a change is detected in designated, monitored folders on mobile devices 10 (e.g., in a folder residing on one of mobile devices 10), and to be synchronized with a "master image" of the data maintained in cloud network 24 by cloud server 30. Similarly, if there is newly-created data in the master image on cloud server 30, the data is downloaded to one or more of mobile devices 10, and the corresponding folder(s) updated. This capability enables users to share data among multiple devices (and/or users). A full-text index of the data can be created which can be utilized by the user to search during the retrieval process.

Safe module 20 enables newly-created data to be identified on mobile devices 10, on a pre-determined schedule, and be archived as a backup on cloud server 30 according to data categories, without bothering the end user. Safe module 20 provides a persistent memory with a time dimension on all mobile devices 10. Retrieval can also be performed in any of the forms of access described above with the user able: to view a consolidated image of what existed on the device as of the last backup, to view consolidated images of the device's data at previous points in time, to view details of each backup data transfer that occurred by searching basing on file name or content.

DoD module 18 controls the "DoD" process, which can be considered to have two parts: "offlining" and the actual Download-on-Demand. Offlining results in data transferred from cloud server 30 to mobile devices 10, being replaced with a file that looks like the original, but in reality is an abbreviated version of the original. Such a file is usually created if the original file in question is not one that originated natively on the mobile device, but has as its source, peer device. This file, called an "offline file" contains information about the actual location of the file (i.e., the cloud location). When the offline file is accessed, the original file is seamlessly retrieved from the cloud location, and served to the user or application.

This is more complicated, and requires the file open( ) system call to be trapped when the open( ) is for a file that is offline. The open( ) call is suspended, while the restore logic is activated to retrieve the file from the cloud location, and return the file to the file system. Once this is complete, the open( ) operation is allowed to be performed. The act of "trapping" the open( ) system call typically requires an OS kernel module which can suspend the I/O and "call back into user space" to execute the restore operation.

Alternatively, to avoid building a kernel module, on devices with a modern operating system (OS), a less-intrusive approach is possible. Since such flexibility to trap the open( ) system call may or many not exist in all OSs, it is likely that creative methods will have to be used to achieve this effect. As an example, in the case of the Android OS, the approach uses file-selection notifications (called "Intents" in Android), and the capability in Android to inform a user of files that have been opened or accessed (referred to generally herein as file-access notifications)—via the "FileObserver" API in Android. By registering for file-selection notifications on file selection, such implementations of the present invention receive information as a user browses media files with the possible intention of opening the files.

When a file is actually opened for use, a file-access notification is received by the system. When both notifications (file-selection and file-access) are received for the same file, the system interprets this to mean that a file has been selected and opened for viewing or listening. Such a situation results in the system immediately recovering the designated file from cloud server 30, and "broadcasting" an intent to open the file so that the appropriate application may open it. Such a method effectively disallows spurious open calls that could result from backup or anti-virus applications because such open calls will trigger file-access notifications, but without being preceded by equivalent file-selection notifications.

It is noted that file-access notifications can be created for any type of file operation which can include anti-virus checking, backup, and examining file or MIME type. Such file-access notifications may be generated before or after the operation has been performed, and can occur for operations that are not valid access operations in their true sense (e.g., Microsoft Explorer checking a file extension in order to determine an appropriate icon or thumbnail to display). It is further noted that file-selection notifications refer to any form of file selection, and are independent of OS or file-system type.

Once in cloud server 30, data can be mined to provide useful analytic information to the user which can be presented in a dashboard or emailed report, for example, depending on the use case. As examples, use cases can include parental governance and corporate compliance.

Parental governance allows parents to be alerted to inappropriate use of a mobile device by their children. Examples of alert parameters include:

1) looking for "taboo" words in emails and/or text messages;
2) identifying inappropriate websites visited; and
3) inappropriate music, videos, or other content.

Wipe/scream module 22 provides protection to the user in the case of theft or loss of a device by using the device's GPS capabilities to track and identify the device's location at any point in time. In order to ensure that none of the information (e.g., email, text messages, contacts, phone numbers, and pictures) on the device is compromised by unauthorized individuals, the user can "wipe" selected data from the "image" of the device on cloud server 30, resulting in the removal of the data from the device when the next synchronization occurs. A "scream" function enables the user to cause the device to emit an audible alarm to draw attention to its "missing" or "stolen" status.

Conventional cloud-based storage providers, such as Amazon, Microsoft, and Google, have the drawback of offering services that are not considered adequately secure or private. Users who are open to storing certain information in the cloud are reluctant about storing more-sensitive information (e.g., confidential data, passwords, personal photographs). Embodiments of the present invention that utilize a personal cloud overcome this drawback.

Management UI 32 provides the user with a simple, easy-to-use web interface for configuring device access, searching data, performing data analytics, and controlling data transfer to external clouds. The personal-cloud implementation can be integrated into a conventional Wi-Fi router, which already has a ubiquitous presence in almost every home, or integrated into a set-top box or DVR recorder—data repositories that one finds increasingly in households. By providing connectivity (e.g., via a 3G data card), the personal-cloud implementation allows itself to be accessed even outside the range of normal Wi-Fi routers—becoming a true cloud for the domestic user, even when outside the home, while assuring that the data is stored in a private, encrypted, storage device that the user fully manages and controls.

File-sharing module 40 enables users to share specific files with external collaborators via links within the private-cloud environment. Such links can be redirected to third-party servers to enhance security and obfuscate hacking by concealing the path address.

Such a personal cloud may be accessed by a user via a secure web connection (i.e., using https). Such a method requires a name-resolution server which resolves the web server name that is part of the URL to an Internet Protocol (IP) address. Domain Name Services (DNS) usually resolve the mapping of domain names to corresponding IP addresses. Embodiments of the present invention can also incorporate methods for creating customizable, DNS-routing algorithms in order to bypass traditional name servers.

Name servers typically map a human-recognizable identifier to an internal, system identifier or addressing component. The normal, DNS-resolution process uses record caching. If the same domain name is requested again, the IP address is taken from the cache rather than being queried again in order to increase performance for the resolution process. However, typical DNS requests suffer from two disadvantages.

If an IP address mapped to a domain name changes, it can take up to several hours for the IP address to be effective.

There is a size limit for the amount of data transferred as part of the DNS request.

Embodiments of the present invention enable a personal cloud to be run as a virtual machine inside a regular host computer or a consumer-electronics device. All aspects of such a system are dynamic, including the name of the machine (or device) and its IP address. A user may choose the name of the device during configuration. Such implementations can resolve IP addresses in numerous scenarios, including the following.

IP addresses that change during the lifetime of the cloud (e.g., DHCP)

IP addresses caused by changes in a network interface itself.

IP addresses caused by changes in the parent network (e.g., movement from wireless to LAN).

Multiple network interfaces for a system, each having their own IP address, which can change due to any of the scenarios described above.

DNS-based mechanisms therefore cannot effectively be used for mapping such scenarios due to change-propagation delay. Embodiments of the present invention enable a personal cloud to be connected to a modem or router, and obtain an IP address for access inside the network. A direct public IP addressed mapped to the personal cloud either by having a 3G/4G-based USB modems or by using Wi-Fi access. A local IP address can also be provided behind a firewall for performing internal redirection (e.g., NAT—network access translation).

In such implementations, a DNS-like portal with public URL access can handle name resolution. Every time a personal cloud changes its IP address, the DNS-like portal is updated with the new IP address. Any device trying to connect to a personal cloud connects to the DNS-like portal to obtain the current IP address of the personal cloud. Such a configuration ensures that any IP change is reflected immediately. No domain registrar or name server is used.

Furthermore, a personal cloud can also have multiple IP addresses mapped to the personal cloud. As an example, consider the use case in which a DHCP IP address is used for an internal subnet and a public IP address. In such a configuration, all IP addresses are mapped to the DNS-like portal which selects the best IP address to access based on, but not limited to, network usage and data costs.

Such a routing protocol is extensible to allow additional custom fields and information to be packaged as part of the "handshake" between the personal cloud and the DNS-like portal, allowing for telemetry on usage characteristics, licensing, and other data.

Figures 2A, 2B:
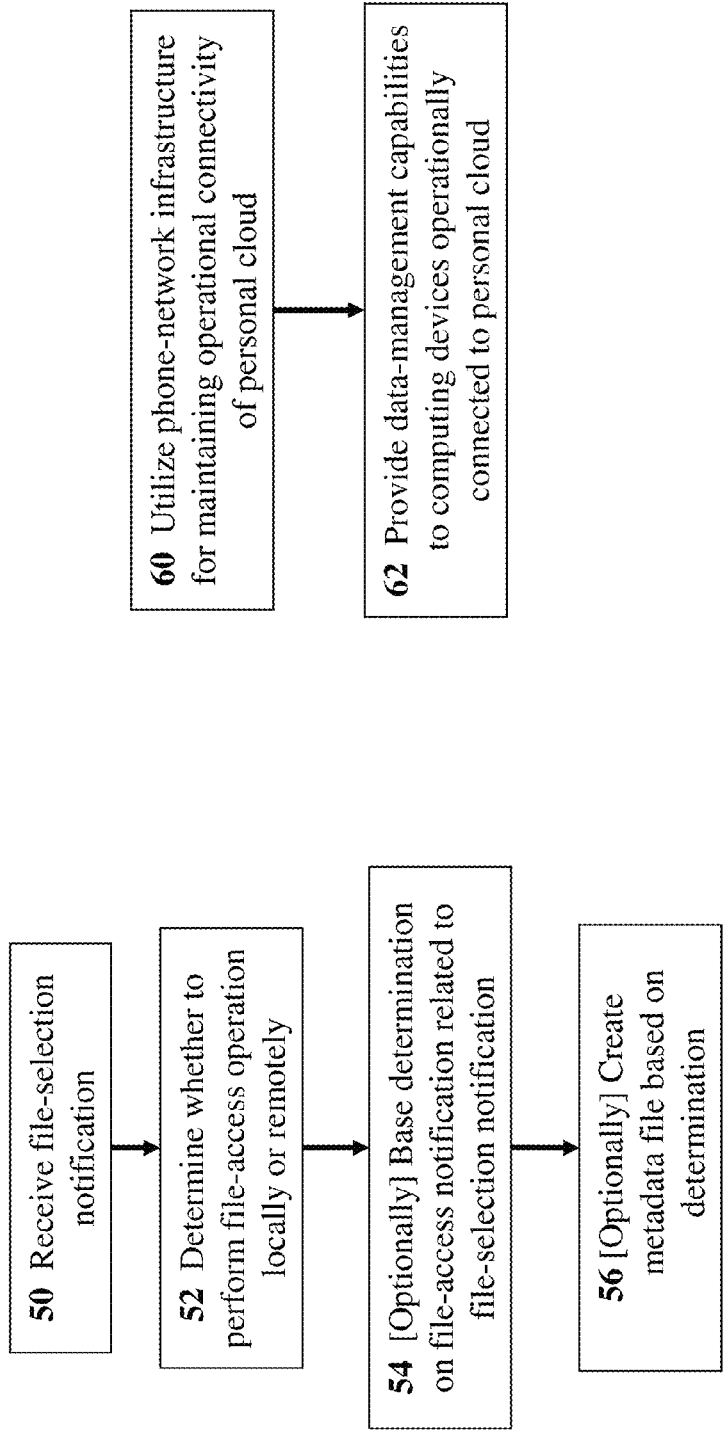
FIG. 2A is a simplified flowchart of the major operational steps in an exemplary implementation of a personal cloud-computing environment with source-independent, automated data aggregation, according to preferred embodiments of the present invention.
FIG. 2B is a simplified flowchart of the major operational steps in an exemplary implementation of a personal cloud-computing environment with ubiquitous mobile access, according to preferred embodiments of the present invention.

FIG. 2A is a simplified flowchart of the major operational steps in an exemplary implementation of a personal cloud-computing environment with source-independent, automated data aggregation, according to preferred embodiments of the present invention. The process begins once a file-selection notification is received from one of the computing devices operationally connected to the personal cloud-computing environment (Step 50). The system determines whether to perform a local file-access operation on the computing device or to perform a remote file-access operation on a remote storage element in the personal cloud-computing environment based on the file-selection notification (Step 52).

The remote storage element can be any storage element on any of the other computing devices operationally connected to the personal cloud-computing environment. Optionally, the system can base its determination on a file-access notification related to the file-selection notification as well (Step 54). Optionally, in addition to standard file-access operations, the file-access operation can include creating a metadata file (Step 56).

Such methods, inter alia, utilize a file-storage system, as opposed to a block-storage system, and circumvent the need to intercept read requests which can potentially be intrusive to the OS environment by requiring a kernel driver or some other kind of system call redirection.

FIG. 2B is a simplified flowchart of the major operational steps in an exemplary implementation of a personal cloud-computing environment with ubiquitous mobile access, according to preferred embodiments of the present invention. The process starts with utilizing a phone-network infrastructure for maintaining operational connectivity of the personal cloud-computing environment (Step 60).

The phone-network infrastructure is then used to provide data-management capabilities to computing devices operationally connected to the personal cloud-computing environment (Step 62). Such methods circumvent, inter alia, the need for port-access protocols and configurations to obtain access outside a local network, providing true ubiquitous mobile access for the personal cloud-computing environment.

While the present invention has been described with respect to a limited number of embodiments, it will be appreciated that many variations, modifications, and other applications of the present invention may be made.

What is claimed is:

1. A method for preventing spurious file-access operations in a personal cloud-computing environment with source-independent, automated data aggregation, the method comprising the step of:

(a) upon receiving at least one file access notification associated with at least one respective given file from at least one computing device operationally connected to the personal cloud-computing environment, determining whether to perform, from a file listing on said at least one computing device, a local file-access operation on said at least one computing device or to perform a remote file-access operation on a remote storage element in the personal cloud-computing environment;

(b) prior to performing a file-access operation, requiring at least one file-selection notification associated with said at least one respective given file to be received prior to said receiving said at least one file-access notification in order to identify valid file-access requests; and (c) performing said file-access operation upon receiving said at least one file-selection notification and said at least one file-access notification;

wherein said remote storage element includes any storage element on any other said at least one computing device operationally connected to the personal cloud-computing environment, thereby preventing spurious file-access operations.

2. The method of claim 1, the method further comprising the steps of:

(b) prior to said step of determining, upon accessing said file listing, accessing at least one metadata file stored on said at least one computing device, wherein said at least one metadata file includes a file location of at least one remotely-stored file; and (c) prior to said step of determining and subsequent to said step of accessing said at least one metadata file, presenting a representation of said at least one remotely-stored file in said file listing, wherein said representation is based on said at least one metadata file.

3. The method of claim 2, wherein said at least one metadata file further includes at least one metadata element selected from the group consisting of: a file name, a file type, a file size, and a file MIME type.

4. A device for preventing spurious file-access operations in a personal cloud-computing environment with source-independent, automated data aggregation, the device comprising:
  (a) a CPU for performing computational operations;
  (b) a memory module for storing data;
  (c) a network connection for communicating across a network; and
  (d) a determination module configured for:
    (i) upon receiving at least one file access notification associated with at least one respective given file from at least one computing device operationally connected to the personal cloud-computing environment, determining whether to perform, from a file listing on said at least one computing device, a local file-access operation on said at least one computing device or to perform a remote file-access operation on a remote storage element in the personal cloud-computing environment;
    (ii) prior to performing a file-access operation, requiring at least one file-selection notification associated with said at least one respective given file to be received prior to said receiving said at least one file-access notification in order to identify valid file-access requests; and
    (iii) performing said file-access operation upon receiving said at least one file-selection notification and said at least one file-access notification;
  wherein said remote storage element includes any storage element on any other said at least one computing device operationally connected to the personal cloud-computing environment, thereby preventing spurious file-access operations.

5. The device of claim 4, wherein said determination module is further configured for:
  (ii) prior to said determining, upon accessing said file listing, accessing at least one metadata file stored on said at least one computing device, wherein said at least one metadata file includes a file location of at least one remotely-stored file; and
  (iii) prior to said determining and subsequent to said accessing said at least one metadata file, presenting a representation of said at least one remotely-stored file in said file listing, wherein said representation is based on said at least one metadata file.

6. The device of claim 5, wherein said at least one metadata file further includes at least one metadata element selected from the group consisting of: a file name, a file type, a file size, and a file MIME type.

7. A non-transitory computer-readable medium, having computer-readable code embodied on the non-transitory computer-readable medium, the computer-readable code comprising:
  (a) program code for, upon receiving at least one file-access notification associated with at least one respective given file from at least one computing device operationally connected to a personal cloud-computing environment, determining whether to perform, from a file listing on said at least one computing device, a local file-access operation on said at least one computing device or to perform a remote file-access operation on a remote storage element in said personal cloud-computing environment;
  (b) program code for, prior to performing a file-access operation, requiring at least one file-selection notification associated with said at least one respective given file to be received prior to said receiving said at least one file-access notification in order to identify valid file-access requests; and
  (c) program code for performing said file-access operation upon receiving said at least one file-selection notification and said at least one file-access notification;
  wherein said remote storage element includes any storage element on any other said at least one computing device operationally connected to the personal cloud-computing environment, thereby preventing spurious file-access operations.

8. The non-transitory computer-readable medium of claim 7, the computer-readable code further comprising: (b) program code for, prior to said determining, upon accessing said file listing, accessing at least one metadata file stored on said at least one computing device, wherein said at least one metadata file includes a file location of at least one remotely-stored file; and (c) code for, prior to said determining and subsequent to said accessing said at least one metadata file, presenting a representation of said at least one remotely-stored file in said file listing, wherein said representation is based on said at least one metadata file.

9. The non-transitory computer-readable medium of claim 8, wherein said at least one metadata file further includes at least one metadata element selected from the group consisting of: a file name, a file type, a file size, and a file MIME type.

* * * * *